(12) United States Patent
Safford et al.

(10) Patent No.: US 7,774,658 B2
(45) Date of Patent: Aug. 10, 2010

(54) METHOD AND APPARATUS TO SEARCH FOR ERRORS IN A TRANSLATION LOOK-ASIDE BUFFER

(75) Inventors: Kevin D Safford, Fort Collins, CO (US); Jeremy Petsinger, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 515 days.

(21) Appl. No.: 11/622,293

(22) Filed: Jan. 11, 2007

(65) Prior Publication Data

US 2008/0172544 A1 Jul. 17, 2008

(51) Int. Cl.
*G06F 11/00* (2006.01)
(52) U.S. Cl. .......................... 714/53; 711/207
(58) Field of Classification Search .................. 714/53; 711/207
See application file for complete search history.

(56) References Cited

U.S. PATENT DOCUMENTS

| | | | | |
|---|---|---|---|---|
| 5,455,834 A | * | 10/1995 | Chang et al. ................. | 714/768 |
| 6,078,987 A | * | 6/2000 | Kongetira .................... | 711/108 |
| 6,134,699 A | * | 10/2000 | Steenburgh et al. ......... | 714/803 |
| 6,901,540 B1 | * | 5/2005 | Griffith et al. ................ | 714/48 |
| 7,032,123 B2 | * | 4/2006 | Kane et al. .................... | 714/5 |
| 7,370,243 B1 | * | 5/2008 | Grohoski et al. ............. | 714/48 |
| 2002/0087825 A1 | * | 7/2002 | Nagapudi et al. ........... | 711/207 |
| 2003/0028746 A1 | * | 2/2003 | Durrant ...................... | 711/206 |
| 2005/0114607 A1 | * | 5/2005 | Cohen ......................... | 711/135 |
| 2006/0026380 A1 | * | 2/2006 | Doi et al. .................... | 711/207 |

* cited by examiner

Primary Examiner—Yolanda L Wilson

(57) ABSTRACT

A method and apparatus for discovering errors in a translation look-aside buffer (TLB). The TLB comprises a content addressable memory (CAM) and a random access memory (RAM). The TLB contains additional logic to check for error when the TLB is not in normal use to translate from a first set of elements, stored as entries in the CAM, to a second set of elements, stored as entries in the RAM. If the TLB is not in normal use, a RAM entry is selected and checked for errors. If an error is detected in the RAM entry, the corresponding TLB entry is purged.

19 Claims, 5 Drawing Sheets

METHOD AND APPARATUS TO SEARCH FOR ERRORS IN A TRANSLATION LOOK-ASIDE BUFFER

FIELD

This invention relates generally to the field of computer memory. More particularly, this invention relates to discovery of errors in a Translation Look-aside Buffer (TLB).

BACKGROUND

A Translation Look-aside Buffer (TLB) is a table in a computer processor's memory that contains information about locations in memory the processor has accessed recently or is soon to access. The table cross-references a program's virtual addresses (such as variables names) with the corresponding absolute addresses in physical memory. Storing these cross-references avoids re-translation of recently used addresses. The TLB enables faster computing because it allows the address processing to take place independent of the normal address-translation pipeline. A TLB is commonly a fully associative cache and is also referred to as an address translation cache. A typical TLB contains anywhere from 32 to 1024 entries.

A TLB is inserted in a critical access path between the Central Processing Unit and a physical memory, and so needs to be very fast. Adding error checking to a TLB, such as parity checks and error correction codes (ECC's), adds too much delay to the caching process, so error checking is not performed until a TLB entry is used. As a consequence, an error in a TLB entry is signaled too late to have proper containment and may be fatal in a processor design.

BRIEF DESCRIPTION OF THE DRAWINGS

The novel features believed characteristic of the invention are set forth in the appended claims. The invention itself, however, as well as the preferred mode of use, and further objects and advantages thereof, will best be understood by reference to the following detailed description of an illustrative embodiment when read in conjunction with the accompanying drawing(s), wherein:

DETAILED DESCRIPTION

Figure 1:
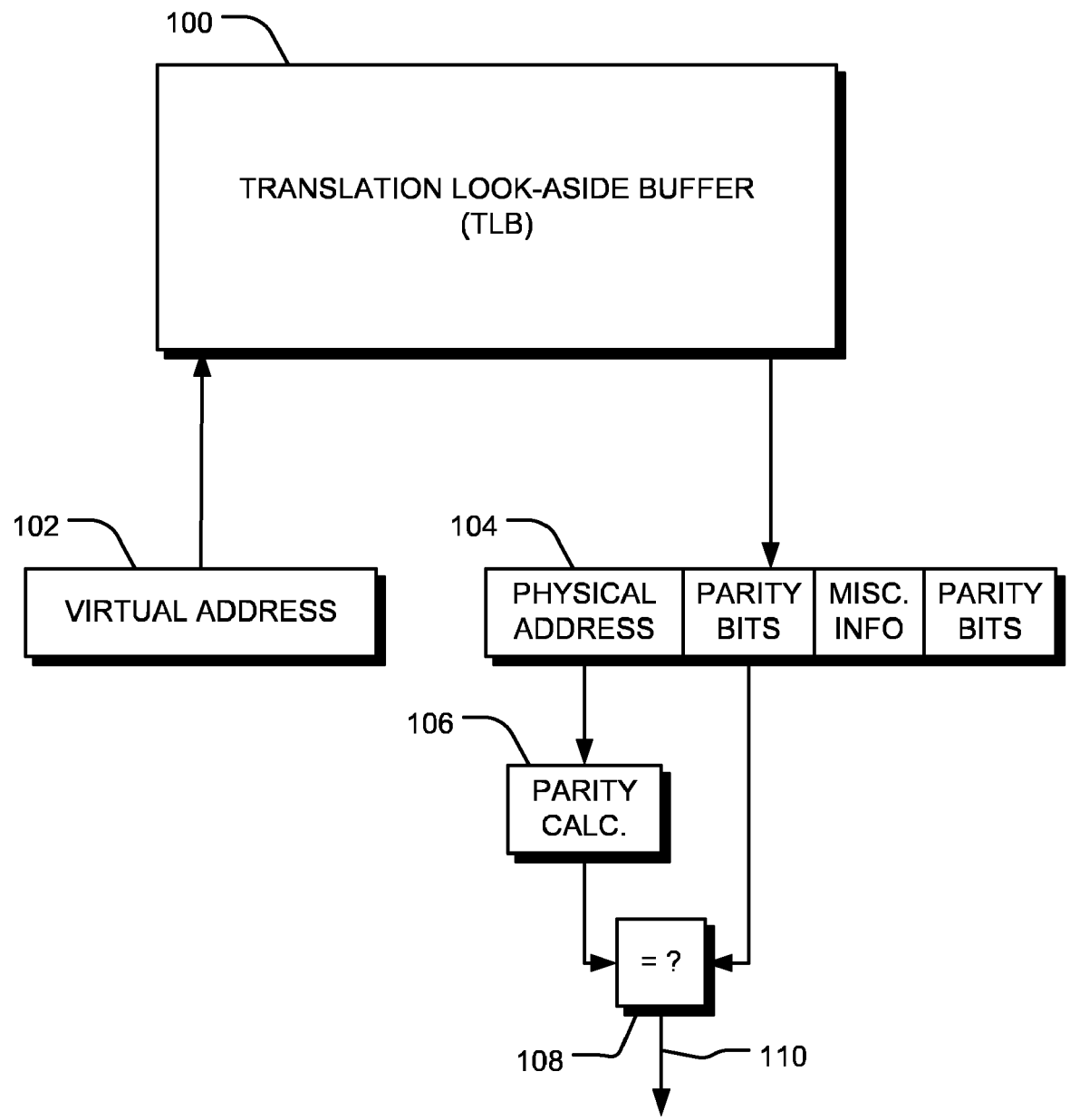
FIG. 1 is block diagram of a translation look-aside buffer with post-lookup error checking.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

FIG. 1 is a block diagram of a translation look-aside buffer (TLB) 100. In operation, a virtual address 102, of a data element or program instruction for example, is presented to the TLB 100. If a match between the virtual address and an address stored in the TLB is found, the corresponding TLB entry 104 is output If no matches are found, a TLB miss is signaled.

The accessed TLB entry 104 includes the physical address corresponding to the virtual address 102 and may also include error checking information, such as parity bits, and other miscellaneous information. Error checking may be performed on the RAM output 104. For example, the parity of the physical address may be calculated in parity calculator 106 and compared in comparator 108 to the recorded parity bits. However, if an error is found, it may have devastating consequence on the process being performed, since the error is signaled too late for proper containment.

Figure 2:
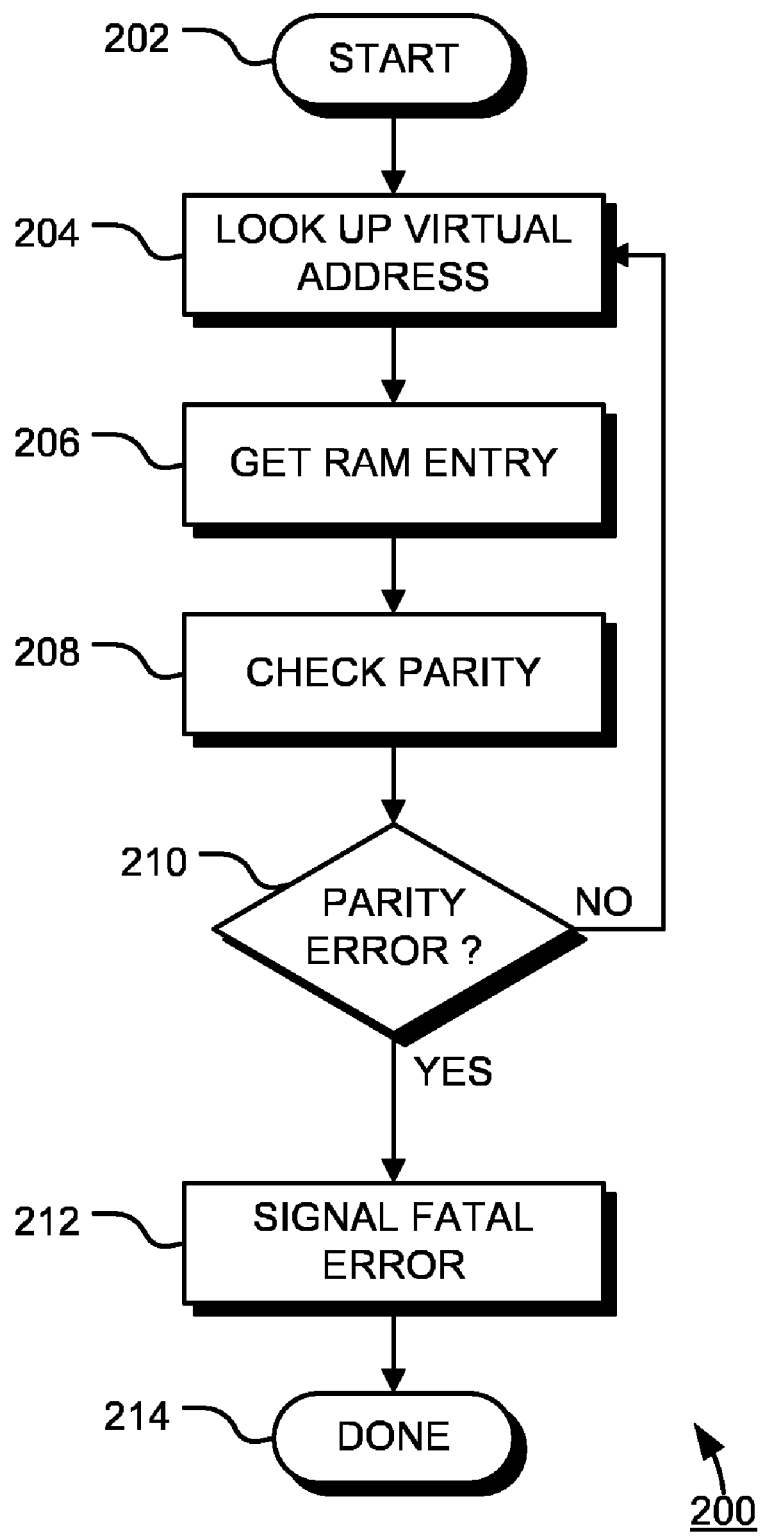
FIG. 2 is a flow chart of a method for post-lookup error checking.

FIG. 2 is a flow chart 200 of a method for post-lookup error checking. Referring to FIG. 2, following start block 202, a virtual address is applied to the TLB at block 204. If a match is found, the corresponding entry is retrieved at block 206. At block 208, error codes, such as parity bits, are calculated for the matching entry. At decision block 210, a check is made to determine if an error, such as a parity error, has occurred. If no error is detected, as indicated by the negative branch from decision block 210, flow returns to block 204 where the next virtual address is looked up. If an error is detected, as indicated by the positive branch from decision block 210, a fatal error is signaled at block 212 and the process terminates at block 214.

Figure 3:
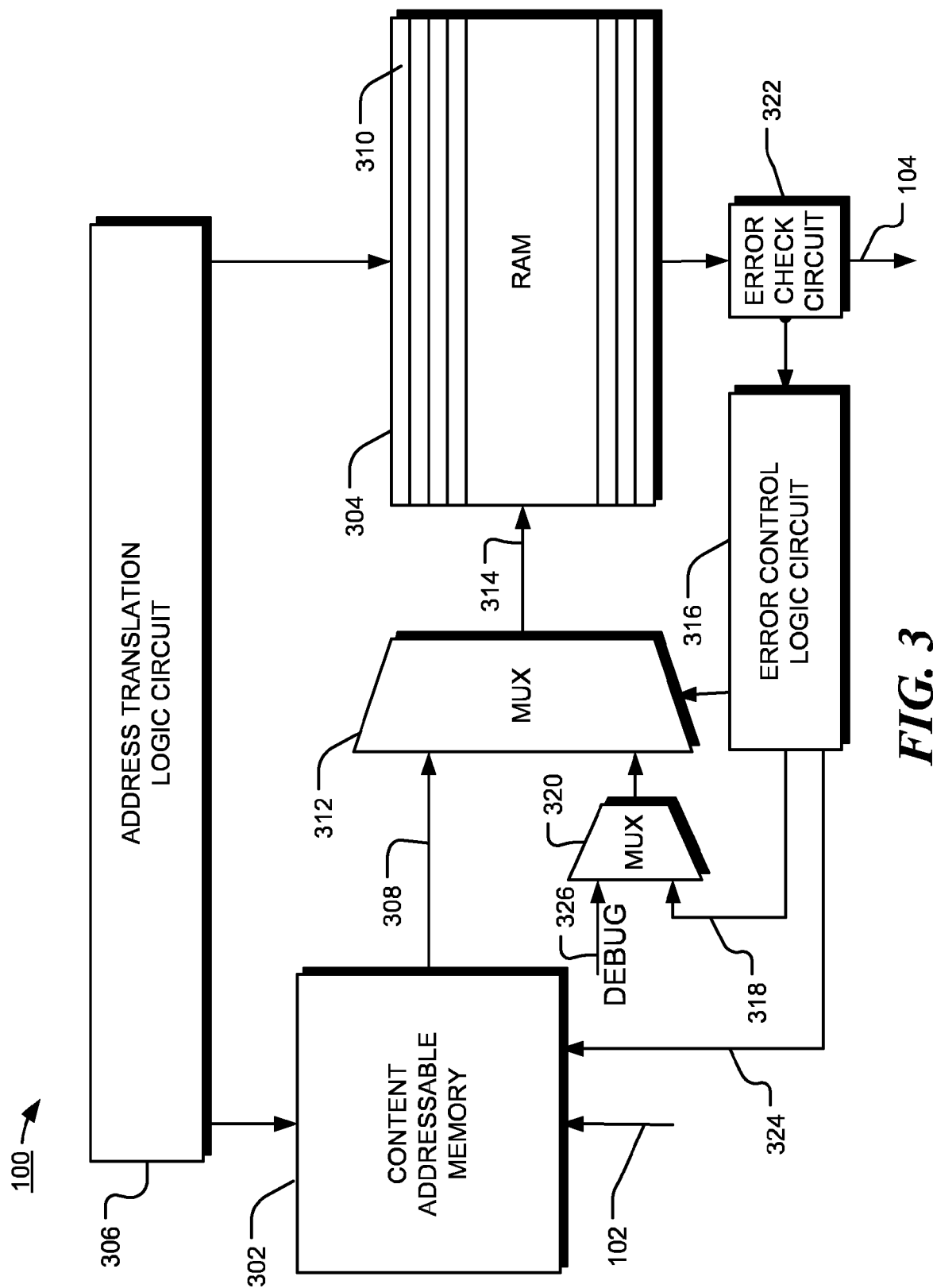
FIG. 3 is a block diagram of a translation look-aside buffer with error checking in accordance with certain embodiments of the invention.

FIG. 3 is block diagram of a translation look-aside buffer (TLB) with error checking in accordance with certain embodiments of the invention. One use of a TLB is to provide a cache of mappings between a first set of elements, such as virtual memory addresses in a computer program, and a second set of elements, such as addresses in a physical memory. TLB's may be used to cache a variety of mappings. Referring to FIG. 3, The TLB 100 includes a content-addressable memory (CAM) 302 and a random access memory (RAM) 304 controlled by address translation logic 306. A content-addressable memory (CAM) 302 is a hardware search engine that performs a search much faster than an algorithmic search. A CAM may be composed of conventional semiconductor memory (such as SRAM) with added comparison circuitry that enables a search operation to complete very rapidly, usually within a single clock cycle. The CAM is arranged as an array of CAM cells. Each row of the array is coupled to a word line 308 that is, in turn, coupled to a row of the RAM. This provides a one-to-one correspondence between rows of the CAM and rows of the RAM.

In this embodiment, the TLB is operable is two modes. For ease of description, the embodiment will be described in terms of a mapping between virtual addresses and physical addresses, however, it is to be understood that the TLB may be used for mappings between other sets of elements. When a virtual address is to be translated, the TLB operates in a first (or normal) mode. In the first mode, a virtual address 102, of a data element or program instruction for example, is presented to the CAM 302. If a match between the virtual address and an address is found, one or more of the word lines 308 is activated.

A selector, such as the multiplexer 312, is set to select the word lines 308 and couple them via lines 314 to the RAM 304. The word lines 308 relate to words (entries) 310 of the random access memory 304. If a single match is found, the corresponding RAM entry 104 is output. If more than one match is found, the matches lines may be arbitrated by an arbitrator or decoder (not shown) to determine which line of the RAM to output. For example, the RAM entry with the lowest address may be output. If no matches are found, a TLB miss is signaled. The RAM output 104 includes the physical address corresponding to the virtual address 102 and may also include error checking information, such as parity bits and checksums, together with other miscellaneous information such as the region identifier and Key. Error checking may be performed on the RAM output 104 by error check circuit 322. For example, the parity of the physical address may be checked.

In accordance with one aspect of the present invention, the TLB 100 includes error control logic 316. In a second (or error-checking) mode of operation of the TLB, error control logic is operated to check for errors in the entries of the TLB. The second mode of operation may be entered when the TLB is not in use for address translation. The second mode of operation may be entered, for example, when the processing unit stalls and during idle cycles.

In the error-checking mode of operation, the multiplexer 312 is set to receive signals 318 from the error control logic 316. These signals, which specify the entry in the RAM to be checked, are applied to the RAM 304 and produce RAM entry 104. The RAM entry 104 is checked for errors in error check circuit 322. If an error is detected, one or more entries in the CAM are deleted (purge) via signal line 324 (optionally, the corresponding RAM entry is also deleted) and the processor is signaled to update the TLB entries (both RAM and CAM entries). Since the architecture allows TLB entries to be removed, all of the TLB entries are deleted in one embodiment. In a further embodiment, only the erroneous entry is deleted. If no error is found, a new RAM address 318 is generated and the next RAM entry is checked for errors. This process continues unless the TLB is needed for virtual address translation, in which case the first (normal) mode of operation is resumed.

In this manner, the TLB entries are checked before they are used, and fatal processing errors are avoided.

In a further embodiment of the invention, the TLB has an ability to select specific RAM entries for debug and test purposes. This functionality may be added by including an additional multiplexer 320 that selects between the RAM address 318 for error checking or a debug RAM address 326.

Figure 4:
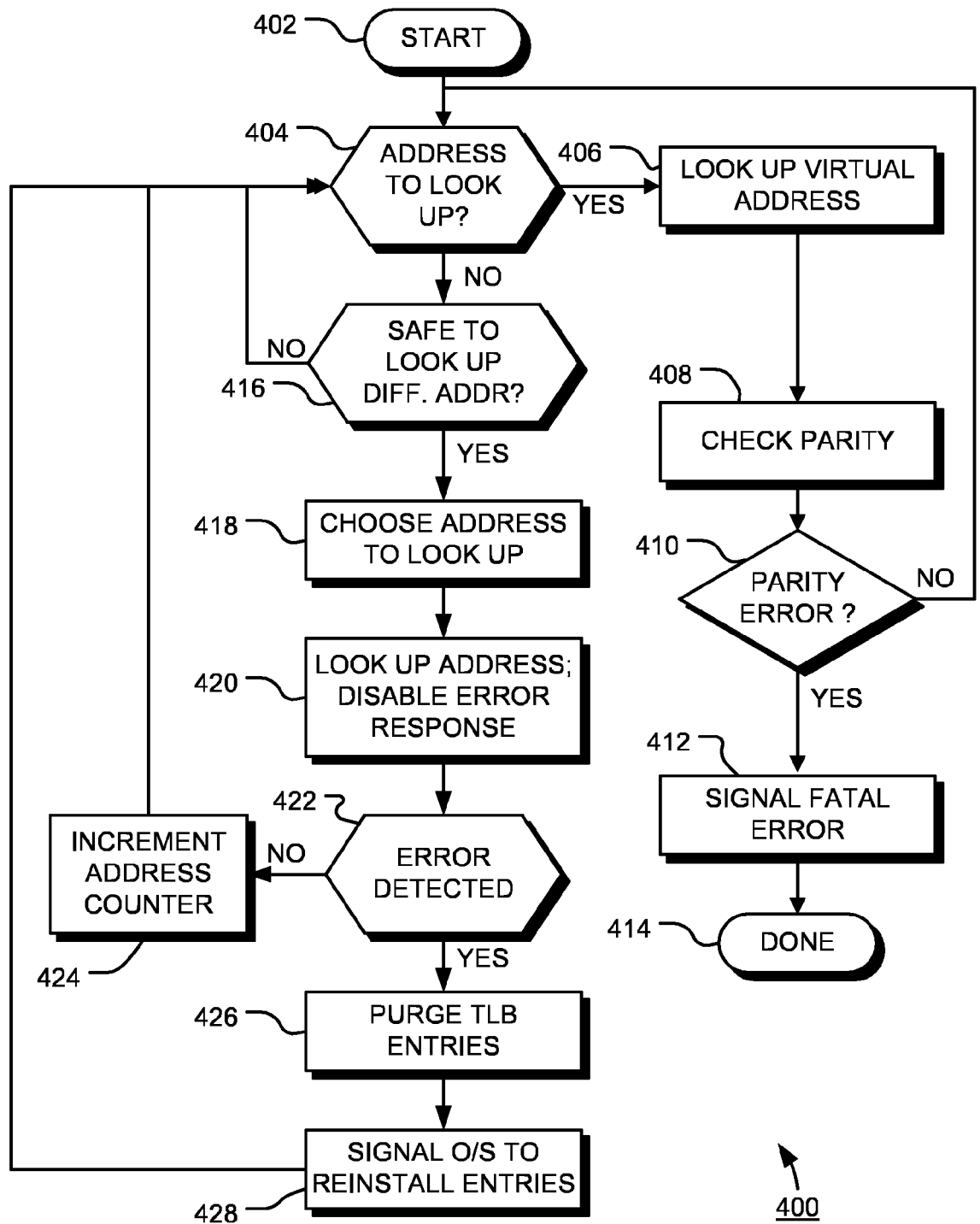
FIG. 4 is a flow chart of a method for translation look-aside buffer error checking in accordance with certain embodiments of the invention.

FIG. 4 is a flow chart of a method 400 for translation look-aside buffer error checking in accordance with certain embodiments of the invention. Following start block 402 in FIG. 4, a check is made at decision block 404 to determine if there is a virtual address to be translated. If an address is to be translated, as indicated by the positive branch from decision block 404, the TLB is operated in the normal mode and the virtual address is looked-up in the TLB at block 406. Error checking, such as parity checking or application of error correction codes, is performed at block 408. At decision block 410, a check is mode to determine if an error has been detected. If no error is detected, flow continues to block 404. If an error is detected, as indicated by the positive branch from decision block 410, a fatal error is signaled at block 412 and the process terminates at block 414. If, on the other hand, the check at decision block 404 determines that there is no virtual address to be translated, flow continues to decision block 416, as indicated by the negative branch from decision block 404. At decision block 416 a check is made to determine if it is safe to look at up a different address. If not, as indicated by the negative branch from decision block 416, flow returns to block 404. Otherwise, as indicated by the positive branch from decision block 416, the error control logic selects a new address to look up at block 418. At block 420, the new address is accessed. As described above, in one embodiment the look-up process includes selecting between a first set of word lines output from the CAM and a second set of word lines. However, it will be apparent to those of ordinary skill in the art that alternative methods may be use to select RAM entries to be checked.

The normal error checking response (which would indicate a fatal error, if an error were found) is disabled during the error discovery process, since the error is not fatal unless the RAM entry is actually used. At decision block 422, a check is made to determine if an error has been detected. If not, as indicated by the negative branch from decision block 422, a new RAM address to be checked is generated at block 424 and flow continues to block 404. The new RAM address to be checked may be generated, for example, by incrementing a counter to cycle through RAM entries. If an error is detected, as indicated by the positive branch from decision block 422, one or more of the TLB entries are purged at block 426 and at block 428 a signal is sent to the operating system to reinstall the entries in the TLB.

Figure 5:
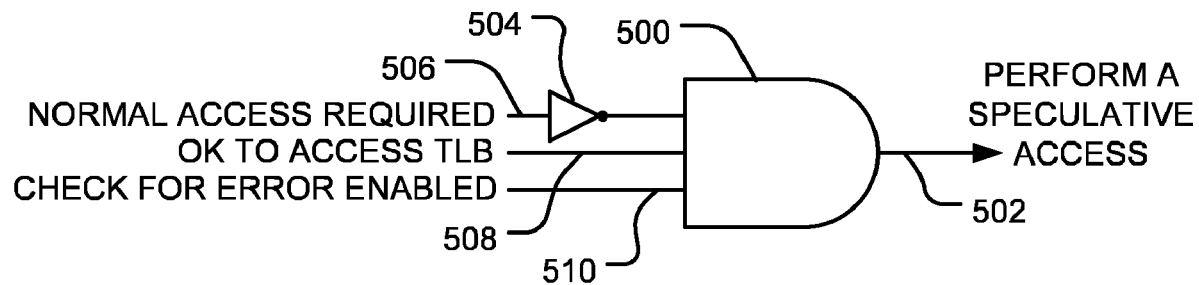
FIG. 5 is a diagram of an exemplary logic circuit in accordance with certain embodiments of the invention.

FIG. 5 is diagram of an exemplary logic circuit in accordance with certain embodiments of the invention. The logic circuit comprises a three-input AND gate 500. The output 502 is asserted when a speculative TLB access for error checking is to be performed. The first input 506 carries a signal that is asserted when normal access of the TLB is required (that is, when the normal mode of operation is in use). This signal is passed through inverter 504 before being applied to the AND gate 500. The second input 508 carries a signal that is asserted when it is safe to access the TLB. This signal may be asserted during stall cycles or idle cycles, for example. The third input 510 carries a signal that is asserted when the error-checking mode is enabled. This allows the error checking mode to be disabled, when desired. The output 502 is only asserted if all of the inputs to the AND gate 500 are asserted.

Figure 6:
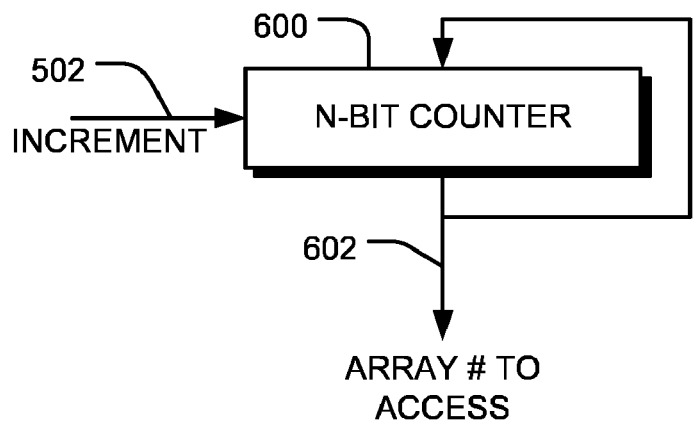
FIG. 6 is a diagram of an exemplary address generator in accordance with certain embodiments of the invention.

FIG. 6 is diagram of an exemplary address generator in accordance with certain embodiments of the invention. The address generator comprises an N-bit counter 600 and generates an array address in the RAM to be accessed for error checking. The counter is incremented when a new address is to be generated. In one embodiment, the counter is incremented by the signal 502 from the logic circuit in FIG. 5. For example, if the TLB contains 128 entries indexed as 0-127, a 7-bit counter is used.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A translation look-aside buffer operable in a first mode of operation to translate a first set of elements to a second set of elements and operable in a second mode of operation to check for errors in entries of the translation look-aside buffer, the translation look-aside buffer comprising:

a content addressable memory operable to receive an element of the first set of elements and control a first set of word lines;

a random access memory operable to store the second set of elements;

a first logic circuit operable to control the content addressable memory during the first mode of operation;

a second logic circuit operable to control a second set of word lines during the second mode of operation:
a selector operable to couple the first set of word lines to the random access memory during the first mode of operation and to couple the second set of word lines to the random access memory during the second mode of operation and thereby access an entry of the random access memory; and
an error checking circuit operable to detect an error in the accessed entry of the random access memory;
wherein, during the second mode of operation, the second logic circuit is operable to purge a translation look-aside buffer entry corresponding to the accessed entry of the random access memory if an error is detected in the accessed entry of the random access memory.

2. A translation look-aside buffer in accordance with claim 1, wherein the second logic circuit is operable to control the selector.

3. A translation look-aside buffer in accordance with claim 1, wherein the error checking circuit is operable to check one or more parity bits in the accessed entry of the random access memory.

4. A translation look-aside buffer in accordance with claim 1, wherein the second logic circuit comprises an address generator, operable to generate a sequence of random access memory entry locations.

5. A translation look-aside buffer in accordance with claim 4, wherein the address generator is a counter.

6. A translation look-aside buffer in accordance with claim 1, wherein the second logic circuit is further operable to determine when the translation look-aside buffer is not in use to translate from an element of the first set of elements to an element of the second set of elements.

7. A translation look-aside buffer in accordance with claim 6, wherein the second logic circuit is operable to detect a stall condition.

8. A translation look-aside buffer in accordance with claim 6, wherein the second logic circuit is operable to detect an idle condition.

9. A translation look-aside buffer in accordance with claim 6, wherein the translation look-aside buffer is controlled by an operating system program and wherein second logic circuit is further operable to signal the operating system program to replace a translation look-aside buffer entry when a translation look-aside buffer entry has been purged.

10. A translation look-aside buffer in accordance with claim 1, wherein:
in response to a positive determination that an element of the first set has been received for translation, the translation look-aside buffer operates in the first mode of operation to translate the element of the first set; and
in response to a negative determination that an element of the first set has been received for translation, the translation look-aside buffer operates in the second mode of operation to check for errors in one or more of the elements of the second set and to purge from the content addressable memory any translation look-aside buffer entries corresponding to of the elements in the second set determined to be erroneous.

11. A method for discovering errors in a translation look-aside buffer (TLB) controlled by an operating system program and comprising a content addressable memory (CAM) and a random access memory (RAM), the method comprising: detecting if the TLB is in use to translate from a first set of elements, stored as entries in the CAM, to a second set of elements, stored as entries in the RAM; and if the TLB is not in use to translate from the first set of elements to the second set of elements, selecting a RAM entry detecting errors in the RAM entry and purging the TLB entry corresponding to the RAM entry if an error is detected in the RAM entry: and if the TLB is in use to translate from the first set of elements to the second set of elements, translating from an element of the first set of elements to an element of the second set of elements, detecting errors in the elements of the second set of elements, and signaling the operating system program that an error has been detected if an error is detected in the element of the second set of elements.

12. A method in accordance with claim 11, wherein the translating from an element of the first set of elements to an element of the second set of elements comprises: applying the element of the first set of elements to the CAM to select a CAM entry corresponding to the element of the first set of elements and control a first set of word lines; and applying the first set of word lines to the RAM to select a RAM entry corresponding to the element of the second set of elements.

13. A method in accordance with claim 12, wherein the selecting of a RAM entry comprises: generating a RAM address; controlling a second set of word lines in accordance with the RAM address; and controlling a word line selector to couple the second set of word lines to the RAM to select the RAM entry.

14. A method in accordance with claim 11, further comprising signaling the operating system program to reinstall the purged TLB entry if an error is detected in the RAM entry.

15. A method in accordance with claim 10, wherein the purging of the TLB entry comprises deleting the corresponding CAM entry.

16. A method in accordance with claim 11, wherein the purging of the TLB entry comprises deleting all entries in the TLB.

17. A method in accordance with claim 11, wherein the selecting of a RAM entry comprises incrementing an address counter to generate an address in the RAM.

18. A translation look-aside buffer controlled by an operating system program, comprising: an address cache having a plurality of cache entries; means for translating virtual memory addresses stored as respective ones of the cache entries to physical memory addresses stored as respective entries in a random access memory; a means for detecting when the address cache is not in use to translate from the virtual memory addresses to the physical memory addresses; a means for accessing an entry of the plurality of cache entries when the address cache is not in use to map translate from the virtual memory addresses to the physical memory addresses; a means for detecting an error in the accessed entry; and a means for purging the address cache entry corresponding to the accessed entry if an error is detected in the accessed entry; means for detecting errors in a given one of the physical memory addresses when the address cache is in use to translate from a given one of virtual memory addresses to the given physical memory address; and means for signaling the operating system program that an error has been detected if an error is detected in the given physical memory address.

19. A translation look-aside buffer in accordance with claim 18, further comprising means for signaling the operating system program to reinstall the purged address cache entry.

* * * * *

UNITED STATES PATENT AND TRADEMARK OFFICE
CERTIFICATE OF CORRECTION

| | | |
|---|---|---|
| PATENT NO. | : 7,774,658 B2 | Page 1 of 1 |
| APPLICATION NO. | : 11/622293 | |
| DATED | : August 10, 2010 | |
| INVENTOR(S) | : Kevin D. Safford et al. | |

It is certified that error appears in the above-identified patent and that said Letters Patent is hereby corrected as shown below:

In column 2, line 62, after "address" insert -- stored in the CAM --, therefor.

In column 5, line 2, in Claim 1, delete "operation:" and insert -- operation; --, therefor.

In column 6, line 4, in Claim 11, delete "entry detecting" and insert -- entry, detecting --, therefor.

In column 6, line 5, in Claim 11, delete "entry and" and insert -- entry, and --, therefor.

In column 6, line 6, in Claim 11, delete "entry:" and insert -- entry; --, therefor.

In column 6, line 10, in Claim 11, delete "elements of" and insert -- element of --, therefor.

In column 6, line 31, in Claim 15, delete "claim 10" and insert -- claim 11, --, therefor.

Signed and Sealed this
Eighth Day of March, 2011

David J. Kappos
*Director of the United States Patent and Trademark Office*